July 14, 1959 R. PECK ET AL 2,894,548
CLAMP WITH INTERCHANGEABLE PRESSURE PAD
Filed Jan. 9, 1956 2 Sheets-Sheet 1
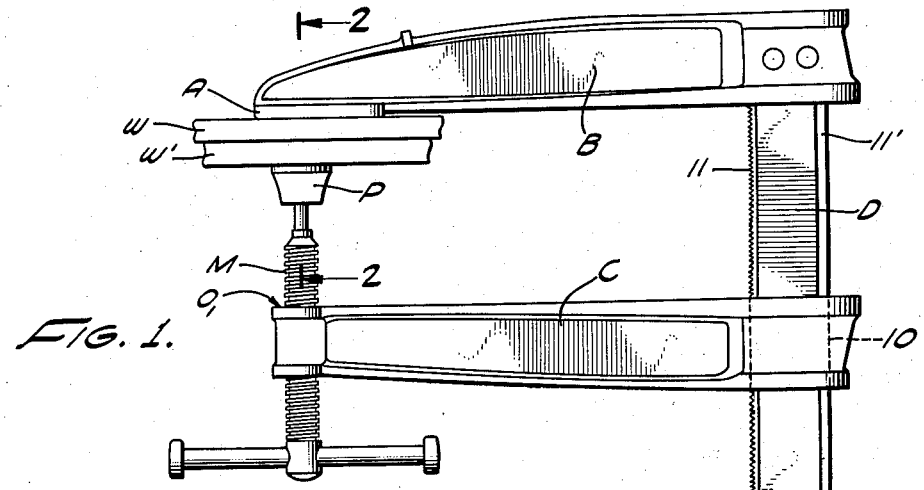
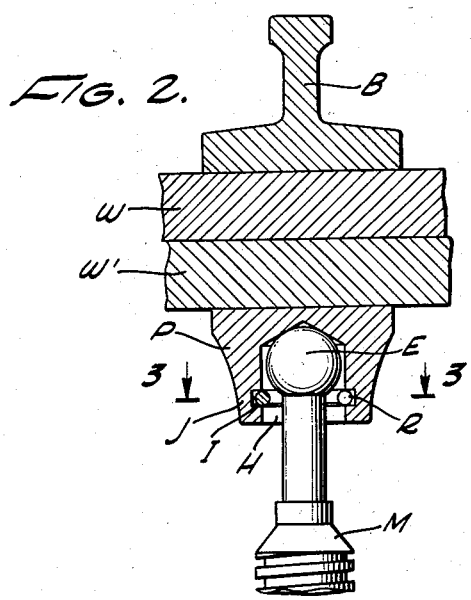
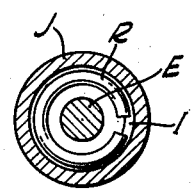
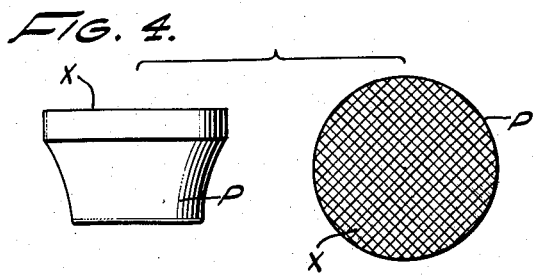
RUDOLPH PECK,
MALCOLM N. RICH
INVENTORS
BY *Malcolm N. Rich*
ATTORNEY July 14, 1959 R. PECK ET AL 2,894,548
CLAMP WITH INTERCHANGEABLE PRESSURE PAD
Filed Jan. 9, 1956 2 Sheets-Sheet 2

RUDOLPH PECK
MALCOLM N. RICH
INVENTORS

BY *Malcolm N. Rich*

ATTORNEY

United States Patent Office 2,894,548
Patented July 14, 1959

2,894,548

CLAMP WITH INTERCHANGEABLE PRESSURE PAD

Rudolph Peck and Malcolm N. Rich., Los Angeles, Calif.

Application January 9, 1956, Serial No. 557,886

1 Claim. (Cl. 144—303)

This invention relates to clamps and more particularly to an improved type of pressure plate for clamps.

Heretofore in the art a plurality of different types of clamps have been devised. All types of clamps, however, are provided with an abutment plate and a pressure plate. The abutment plate is permanently affixed to one arm of the clamp and the pressure plate is affixed on the end of a movable pressure-exerting member in the other arm of the clamp. The movement of the pressure-exerting member is such that the pressure plate is moved towards the abutment plate to secure therebetween any work piece disposed in position between the two said plates.

In general the pressure exerting member of said clamp is comprised of a threaded bolt or screw member mounted in a threaded opening in the said other arm of the clamp in such manner as to be aligned axially perpendicularly to the face of the abutment plate and centered thereto. The pressure plate is affixed to the forward end of the said bolt or screw member usually in a ball and socket type of joint to provide some swivel movement to the pressure plate to permit it to adapt itself to relatively small inequalities of surface on the work piece it is in contact with.

The type of ball and socket joint employed in the art for most clamps comprises a ball end on the end of the threaded bolt and a hemispherical recess centrally disposed in the rear surface of the pressure plate and adapted to receive and seat therein the ball end of the bolt. The outer edge of the said hemispherical recess is usually mechanically deformed, as by crimping or peening, to lock the pressure plate securely in position on the ball end of the bolt.

The locking of the pressure plate in position upon the ball end of the threaded bolt or screw member of the clamp materially limits the utility of the clamp. In service use the threaded bolt or screw member of the clamp is the member most likely to be damaged. When this occurs the clamp itself must be discarded as there is no easy way to remove and replace the threaded bolt with its pressure plate secured to the ball end thereof. Frequently, also, with any standard size or type of clamp, it is desirable to employ longer or shorter threaded bolts to adapt the clamp to various thicknesses of work pieces to be secured together by the clamp. Furthermore, it is not unusual for the pressure plate to be deformed so that it either becomes detached or must be detached from the ball end.

The object of this invention is to enlarge the utility of clamps in general by providing therefor detachable pressure plates for ball-ended threaded bolts and other types of pressure exerting members thereby to permit, with any given type of clamp or standard size of clamp, the substantially free interchanging of threaded bolts and pressure plates in the clamp.

Another object is to improve the utility of clamps in general by providing interchangeable snap-on and snap-off pressure plates for the ball-ended threaded bolt members of said clamps, the said interchangeable pressure plates each being provided with a different size, shape or configuration on the pressure-exerting face thereof thereby to adapt the clamp for utility with work pieces of substantially different size or surface shape.

A further object is to enlarge generally the utility of any type of clamp provided with a ball-ended pressure-exerting member by providing therefor a readily attachable and detachable pressure plate for said ball-end.

Other objects and advantages will be apparent as the invention is more fully hereinafter disclosed.

In accordance with these objects we have devised an improved type of pressure plate and an improved type of means for detachably securing the pressure plate onto the ball-end of a ball-ended pressure exerting member of a clamp which materially improves the utility and service life of clamps employing a ball-ended pressure-exerting member therein, one specific embodiment of which improvement, along with various contemplated modifications thereof, is illustrated in the accompanying drawings. It is to be understood, however, that the specific embodiment of the invention shown in the drawings and hereinafter described in the specification is being shown and described by way of example and not as a limitation of the present invention, as one skilled in the art will readily perceive.

Referring to the drawings:

Fig. 1 is a side elevational view showing one type of clamp improved in accordance with the present invention;

Fig. 2 is an enlarged sectional view of the same taken along plane 2—2 of Fig. 1;

Fig. 3 is a sectional view of the same taken along plane 3—3 of Fig. 2;

Fig. 4 is an enlarged side elevation and top plan view, left and right respectively, of the detachable pressure plate improvement of the present invention;

Figure 8:
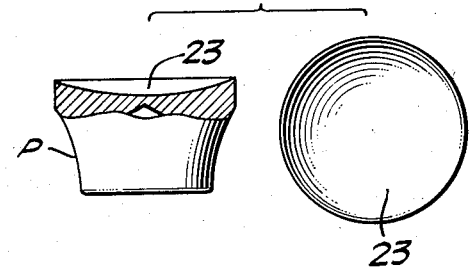
Figure 9:
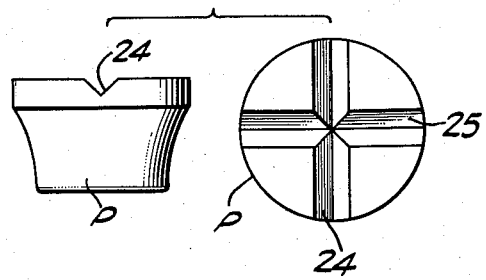
Figure 10:
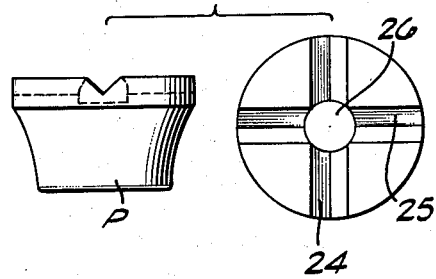
Figure 11:
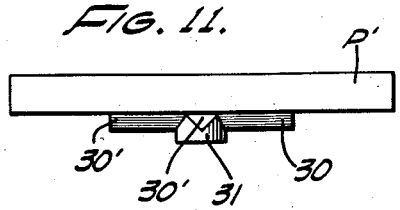

Figs. 5 to 10, inclusive, illustrate in two views each, side and top views respectively from left to right, the interchangeable feature of the detachable pressure plate improvement of the present invention; and Fig. 11 illustrates a further feature adapted to cooperate with the modification illustrated in Fig. 10.

Referring now to Fig. 1, the clamp illustrated in this figure is one of a plurality of the types of clamps common in the art and is here shown by way of example and not by way of limitation. Any other type of clamp may be substituted for the type of clamp shown without departure from the invention.

The type of clamp shown in Fig. 1 is an adjustable type of clamp and is only one of many such types of clamps common in the art. In this type of clamp the abutment plate A is fixedly secured in position on the immovable arm B of the clamp and the pressure-exerting member M is disposed in position on the movable arm C of the clamp. The movable arm C in the clamp illustrated is slidably mounted on the rear bar D of the clamp to be movable therealong from a position closely adjacent the immovable arm B to a position remote from said immovable arm B. This relative movement of the two arms B and C on the rear bar D is accomplished in this instance by providing the arm C with a bore passageway 10 approximating but larger than the cross-section of the bar B such that the arm C may readily be moved therealong and by providing the opposite side edges of the bar B, which is substantially rectangular in cross-section, with serrations or teeth 11—11' which frictionally engage the inner surface of the bore passageway 10 the instant any pressure is exerted by the pressure-exerting member M on the end of arm C to cause the arm C to depart from parallel spaced relation with arm A.

Inasmuch as the present invention does not relate to the clamp, per se, further disclosure with respect to the clamp illustrated is unnecessary.

Referring now to the pressure-exerting member M and to the pressure plate P detachably mounted on the end thereof, the member M, in this specific embodiment, comprises a threaded bolt or screw passing through a correspondingly threaded opening $O_1$ in the end of the arm C, the said bolt or member M being provided with a ball-end E (Fig. 2). This ball-end E of the pressure-exerting member M is common in the art and in most instances the diameter of the ball-end E approximates but is smaller than the outside diameter of the threaded bolt to permit the ball-end to pass freely through the threaded opening $O_1$ in the arm C.

In accordance with the present invention the pressure plate P is detachably secured to the ball-end E of the member M. To accomplish this result we have provided a split ring means R having an inside diameter approximating but smaller than the diameter of the ball-end E, and dispose this split ring R in an annular recess I in an overlying position in the depending skirt J to the hemispherical socket recess H in such manner as to be engaged by the ball-end E in passing through the skirt J to be seated in said recess H to be expanded in passing over the ball-end E as the ball-end E is seated in the recess H and to return to its unexpanded diameter after passing over the ball-end E thereby to secure the pressure plate P detachably on the said ball-end E with the ball-end E in seated position in the recess H.

It is believed clearly shown in the drawings that with any given diameter ball-end E the pressure plate P may be provided with a socket recess H at the bottom of the depending skirt area J which has a diameter and depth adapted to receive and seat the ball-end E therein. The depending skirt section J also may be provided with adequate thickness and length to provide for the proper location of the annular recess I therein for the mounting of the split ring R therein to accomplish the desired result of the present invention. The particular size, shape and configuration of the split ring R may be widely varied without departure from the invention as may also the spring strength of the split ring. The main function of the split ring R is to detachably secure the pressure plate P on the ball-end E. We have found it desirable to so locate the split ring R substantially as shown to provide the maximum degree of swivel movement to the pressure plate P on the ball-end E.

In the specific example shown the split ring R is a round wire comprised of a single turn of a coil spring consisting of a spring steel alloy used commonly for automotive purposes. The particular composition of the split ring R forms no part of the present invention and a large number of spring compositions are available in the art and may be used without departure from the invention.

The split ring R should be designed so as to have sufficient spring strength to permit the pressure plate P to be snapped on easily over the ball-end E and sufficient strength to retain the pressure plate thereon except when pulled positively to remove same from the ball-end of the member M. A wide variety of spring strengths produces this required result.

To obtain the maximum swivel movement of the pressure plate P on the ball-end E the inside diameter of the split ring R should be slightly less than the diameter of the ball-end E and the annular recess I should be located substantially in the position indicated in the drawings to bring the split ring R as remote from the tapered end of the member M as possible.

Referring now to Fig. 4, the usual pressure plate P is shaped substantially as indicated in this Fig. 4 although the pressure face X thereof may be plain surfaced or provided with a friction surface is shown in this figure. The pressure plate usually is comprised of cast or forged heat-treatable steel, machined to size, the steel composition in each instance being under the maximum pressures the clamp is designed to apply. The particular steel composition employed in the pressure plate P is not a part of the present invention.

When the pressure plate P is provided with the split ring means R for detachably securing the plate P on the ball-end E of the pressure-exerting member M, a plurality of pressure plates P may be provided, each adapted to be interchangeably detachably secured on the ball-end of the same member M, with each plate P provided with a differently shaped pressure face X such as, for example, the different types of interchangeable pressure plates illustrated in Figs. 5 to 10 inclusive.

Figure 5:
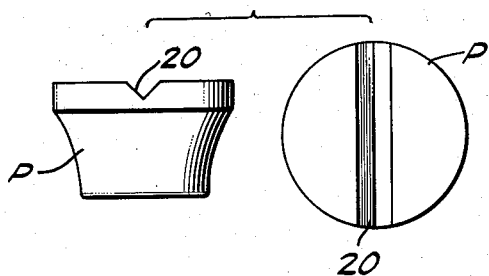
Figure 6:
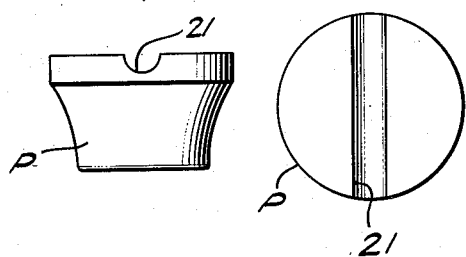
Figure 7:
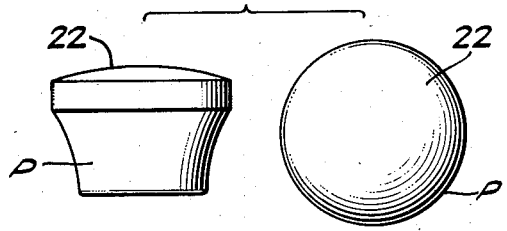

In Fig. 5 the V-groove 20 shown is adapted to engage work pieces w—w' having angular or rounded surfaces; in Fig. 6 the half-round groove 21 is adapted to engage work pieces having rounded surfaces; in Fig. 7 the convex surface 22 is adapted to engage work pieces having a concave surface; in Fig. 8 the concave surface 23 is adapted to engage work pieces having a convex surface; in Fig. 9 the crossed V-grooves 24—25 can engage work pieces of either angular or rounded shape; and the type of pressure plate P indicated in Fig. 10, provided with crossed V-grooves 24—25 and a centrally located pin hole recess 26, may be utilized for general utility in engaging angular or rounded surfaces on the work pieces w—w' or may be used to engage specially designed pressure plates, such as the one illustrated in Fig. 11, to meet special clamping problems or situations. The sizes of the V-grooves, half-round grooves and pin-hole recesses may be widely varied without departure from the invention.

As indicated in Fig. 11, the special pressure plate P', which may be square, circular or rectangular in shape, is provided on its rear face with V-shaped rib extensions 30—30' disposed at right angles to each other and with a centrally located pin extension 31, the said rib extensions 30—30' being adapted to seat within the V-grooves 24 and 25 of the pressure plate P shown in Fig. 10 and the said pin extension 31 being adapted to seat within the pin-hole recess 26 of the pressure plate P. Such an auxiliary pressure plate P' may be provided with a plurality of shapes and pressure face contours to meet any special working condition involving the clamp without limiting the utility of the clamp for normal use and without departure from the invention.

It is believed apparent that by means of the detachable pressure plate of the present invention the utility of any given sized clamp or any given type of clamp may be greatly improved and extended by means of the differently shaped interchangeable pressure plates generally illustrated in Figs. 4 to 11 inclusive and that a single clamp provided with a plurality of such interchangeable pressure plates thereby can be utilized widely in the art of clamping differently shaped work pieces together.

Various other variations and modifications of the detachable pressure plate of the present invention than those shown and described may occur to those skilled in the art and all such are contemplated as may fall within the scope of the following claim.

What we claim is:

In a clamp having a ball-ended pressure applying member and a pressure plate detachably mounted on the ball end thereof, said pressure applying member having a substantially smooth and unobstructed elongated reduced diameter shank extension thereon terminating at said ball end, the diameter of said ball end being materially greater than the diameter of said reduced shank extension, said pressure plate having a work engaging front face and a rear face, the rear face of said pressure plate being provided with an inwardly extending recess of substantially uniform diameter throughout at least a major portion of its depth and thereby forming a seat for the ball end of said pressure applying member, the diameter and depth of said recess being greater than the diameter of said ball end so as to allow a limited axial movement of the said ball end within the recess, said ball end of said pressure applying member being received within said recess, an annular groove formed in the inner wall of said recess adjacent the open end thereof and a split ring having a normal inside diameter substantially less than the diameter of said ball and an expanded diameter greater than the diameter of the ball disposed in said groove to thereby detachably retain the ball end of the pressure applying member within the recess, said recess having a depth less than the length of said elongated reduced shank extension, said recess also having a diameter materially greater than the diameter of said shank extension, the said pressure plate being thereby detachably affixed to said pressure applying member so as to allow limited axial movement as well as substantially free universal movement of said pressure plate, said universal movement being limited only by contact of the inner edge of the said recess with the substantially smooth and unobstructed surface of the elongated reduced shank extension.

References Cited in the file of this patent

UNITED STATES PATENTS

| 769,248 | Brainard | Sept. 6, 1904 |
| 1,387,996 | Menger | Aug. 16, 1921 |
| 1,929,539 | Steuernagel | Oct. 10, 1933 |
| 2,324,803 | Snyder | July 20, 1943 |
| 2,579,995 | Atchison | Dec. 25, 1951 |
| 2,649,123 | Gulland | Aug. 18, 1953 |
| 2,729,126 | Stanton et al. | Jan. 3, 1956 |

FOREIGN PATENTS

| 872,495 | France | June 10, 1942 |